(12) United States Patent
Pan

(10) Patent No.: US 10,798,349 B2
(45) Date of Patent: Oct. 6, 2020

(54) PROJECTING APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/425,975

(22) Filed: May 30, 2019

(65) Prior Publication Data

US 2019/0373227 A1 Dec. 5, 2019

(30) Foreign Application Priority Data

Jun. 1, 2018 (CN) .......................... 2018 1 0557992

(51) Int. Cl.
*H04N 9/31* (2006.01)
*G03B 21/14* (2006.01)
*G02B 5/20* (2006.01)

(52) U.S. Cl.
CPC ............ *H04N 9/3155* (2013.01); *G02B 5/20* (2013.01); *G03B 21/142* (2013.01); *H04N 9/3197* (2013.01)

(58) Field of Classification Search
CPC .... G03B 21/28; G03B 21/142; G03B 21/147; G03B 21/204; G03B 21/208; G03B 21/2013; G03B 21/2033; G03B 21/2053; H04N 9/3111; H04N 9/3114; H04N 9/3117; H04N 9/3135; H04N 9/3152; H04N 9/3155; H04N 9/3158; H04N 9/3194; H04N 9/3197
See application file for complete search history.

(56) References Cited

U.S. PATENT DOCUMENTS

2013/0063704 A1* 3/2013 Hu ....................... H04N 9/3111 353/31
2015/0264326 A1* 9/2015 Hayashi ............... H04N 9/3111 348/760

(Continued)

FOREIGN PATENT DOCUMENTS

CN 101750855 11/2011
CN 102645822 12/2014

(Continued)

*Primary Examiner* — Sultan Chowdhury
(74) *Attorney, Agent, or Firm* — JCIPRNET

(57) ABSTRACT

A projecting apparatus includes an illuminating system and a first sensing module. The illuminating system includes a light source module and a filter element. The first sensing module is disposed beside the filter element, and includes a first light emitter and a first light sensor. The first light emitter emits a first sensing light. Outside the transmission path of the light beam, a first and a second filter regions of the filter element are sequentially cut into a transmission path of the first sensing light. When the first filter region is cut into the transmission path of the first sensing light, the first light sensor generates a first sensing signal, and when the second filter region is cut into the transmission path of the first sensing light, the first light sensor generates a second sensing signal, and the first sensing signal is different from the second sensing signal.

18 Claims, 11 Drawing Sheets

(56) References Cited

U.S. PATENT DOCUMENTS

2016/0187644 A1\* 6/2016 Bhakta ................ G02B 5/1861
                                                      359/292
2017/0264871 A1\* 9/2017 Fujiune ................ H04N 9/3194
2019/0199981 A1\* 6/2019 Murakami ............. H04N 9/312

FOREIGN PATENT DOCUMENTS

| CN | 105353580 | 2/2016 |
|----|-----------|--------|
| CN | 102854592 | 6/2016 |
| EP | 3032329   | 6/2016 |

\* cited by examiner

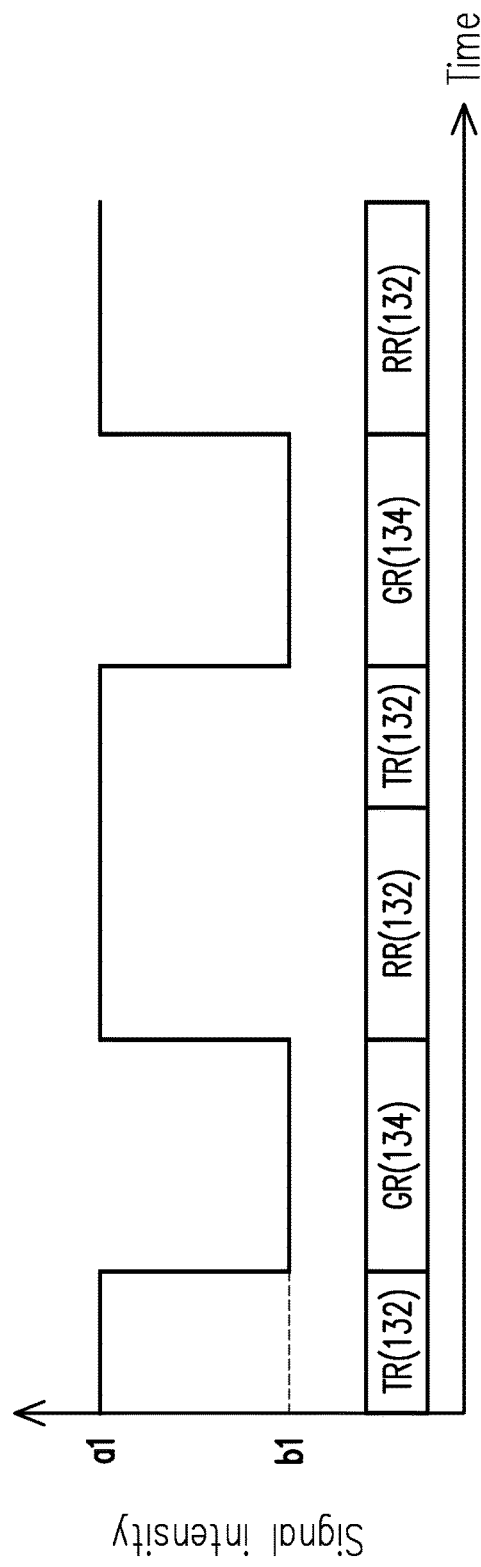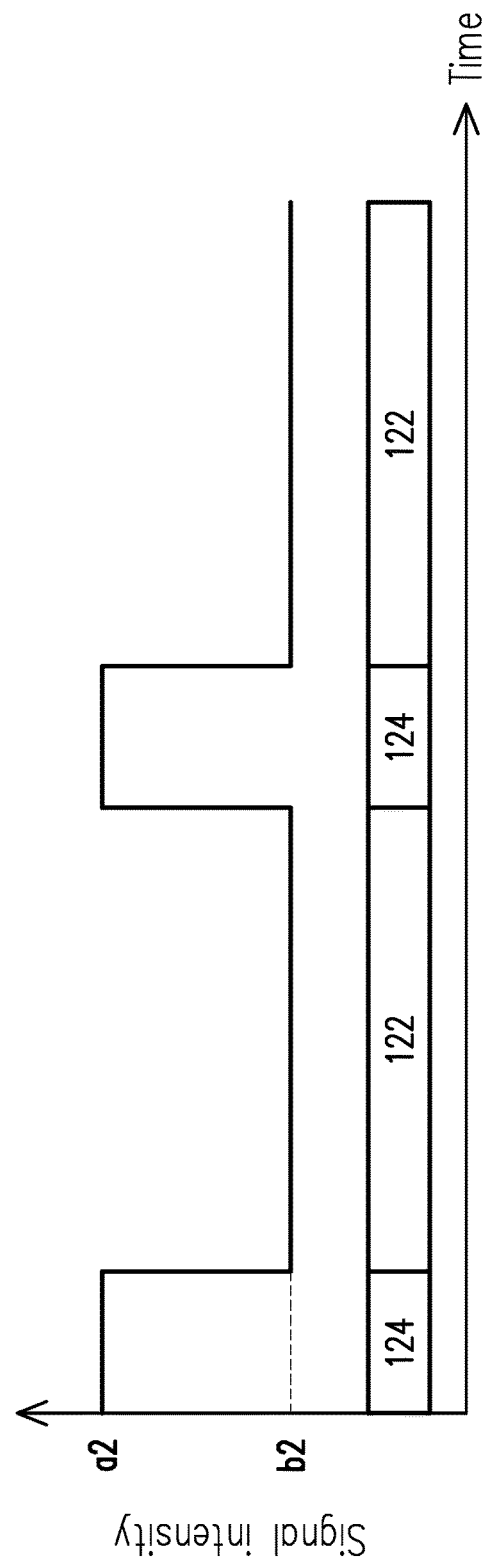

PROJECTING APPARATUS

CROSS-REFERENCE TO RELATED APPLICATION

This application claims the priority benefit of China application serial no. 201810557992.6, filed on Jun. 1, 2018. The entirety of the above-mentioned patent application is hereby incorporated by reference herein and made a part of this specification.

BACKGROUND OF THE INVENTION

1. Field of the Invention

The invention relates to an optical apparatus, in particular to a projecting apparatus.

2. Description of Related Art

The imaging principle of the projecting apparatus is that an illuminating beam generated by an illuminating system is converted into an image beam by a light valve, and then the image beam is projected onto a screen through a projection lens to form an image picture. In order to produce an illuminating beam including components having three primary colors (red, blue, green), the illuminating system in the projecting apparatus may include a phosphor wheel or/and a color wheel. The phosphor wheel or/and the color wheel may have multiple light conversion regions to convert light beams from a light source into different color lights at different time intervals. Therefore, the light valve must be synchronized with the phosphor wheel or/and the color wheel so that the light valve modulates the illuminating beam into the image beam.

At present, a method for detecting the rotation position of the phosphor wheel or the color wheel is to attach a black light-absorbing tape to a specific position on the wheel axle and arrange a sensing module in the corresponding position. The sensing module is able to emit a sensing light and receive the reflected sensing light. When the axle rotates to the specific position, the sensing light emitted by the sensing module is absorbed by the light-absorbing tape, so that the sensing signal detected by the sensing module changes from strong to weak. Therefore, by sensing the intensity of the signal, the rotation position of the phosphor wheel or the color wheel, and the rotation speed of the phosphor wheel or the color wheel can be determined. However, this method requires the additional sticking of the light-absorbing tape, and the method of manually sticking the light-absorbing tape makes it difficult to ensure accuracy and needs additional correction, thereby increasing production processes and production cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projecting apparatus with less production process and production cost.

In order to achieve one, some, or all of the aforementioned objectives or other objectives, an embodiment of the invention provides a projecting apparatus, which includes an illuminating system, a first sensing module, a light valve, a controller and a projection lens. The illuminating system includes a light source module and a filter element. The light source module is used to emit a light beam. The filter element includes a first filter region and a second filter region, and the first filter region and the second filter region are sequentially cut into a transmission path of the light beam. The first sensing module is disposed beside the filter element, and the first sensing module includes a first light emitter and a first light sensor. The first light emitter is used to emit a first sensing light, wherein outside the transmission path of the light beam, the first filter region and the second filter region are sequentially cut into a transmission path of the first sensing light. The first light sensor is used to detects the first sensing light, wherein when the first filter region is cut into the transmission path of the first sensing light, the first light sensor detects the first sensing light and generates a first sensing signal, and when the second filter region is cut into the transmission path of the first sensing light, the first light sensor detects the first sensing light and generates a second sensing signal, and the first sensing signal is different from the second sensing signal. The light valve is disposed on the transmission path of the light beam from the filter element to modulate the light beam into an image beam. The controller is respectively electrically connected to the first sensing module, the filter element and the light valve, and the controller is used to synchronize the filter element with the light valve by using the first sensing signal and the second sensing signal. The projection lens is disposed on a transmission path of the image beam.

In order to achieve one, some, or all of the aforementioned objectives or other objectives, an embodiment of the present invention provides a projecting apparatus, which includes an illuminating system, a first sensing module, a light valve module, a controller and a projection lens. The illuminating system includes a light source module and a wavelength conversion element. The light source module is used to emit a light beam. The wavelength conversion element includes a wavelength conversion region and a light reflection region disposed at a first side thereof, and the wavelength conversion region and the light reflection region are sequentially cut into a transmission path of the light beam. The first sensing module is disposed beside the wavelength conversion element, and the first sensing module includes a first light emitter and a first light sensor. The first light emitter is used to emit a first sensing light, wherein outside the transmission path of the light beam, the wavelength conversion region and the light reflection region are sequentially cut into a transmission path of the first sensing light. The first light sensor is used to detect the first sensing light, wherein when the wavelength conversion region is cut into the transmission path of the first sensing light, the first light sensor detects the first sensing light and generates a first sensing signal, and when the light reflection region is cut into the transmission path of the first sensing light, the first light sensor detects the first sensing light and generates a second sensing signal, and the first sensing signal is different from the second sensing signal. The light valve module is disposed on the transmission path of the light beam from the wavelength conversion element to modulate the light beam into an image beam. The controller is respectively electrically connected to the first sensing module, the wavelength conversion element and the light valve module, and the controller is used to synchronize the wavelength conversion element with the light valve module by using the first sensing signal and the second sensing signal. The projection lens is disposed on a transmission path of the image beam.

Based on the above, in the projecting apparatus according to the embodiments of the present invention, the sensing module is disposed beside the wavelength conversion element or the filter element, and the sensing light emitted by the sensing module is sequentially cut into different regions of the wavelength conversion element or the filter element. Since the sensing module may detect different sensing signals in the different regions, the rotation position and rotation speed of the wavelength conversion element or the filter element can be determined through the difference of the sensing signals. Thus, the projecting apparatus according to the embodiments of the invention can detect the rotation position and rotation speed of the wavelength conversion element and filter element in a simple and accurate manner without additionally sticking the light-absorbing tape or performing additional correction, thereby reducing the production processes and production cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a timing diagram of signal intensity sensed by the first sensing module of FIG. 1.

FIG. 5 is a timing diagram of signal intensity sensed by the second sensing module of FIG. 1.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
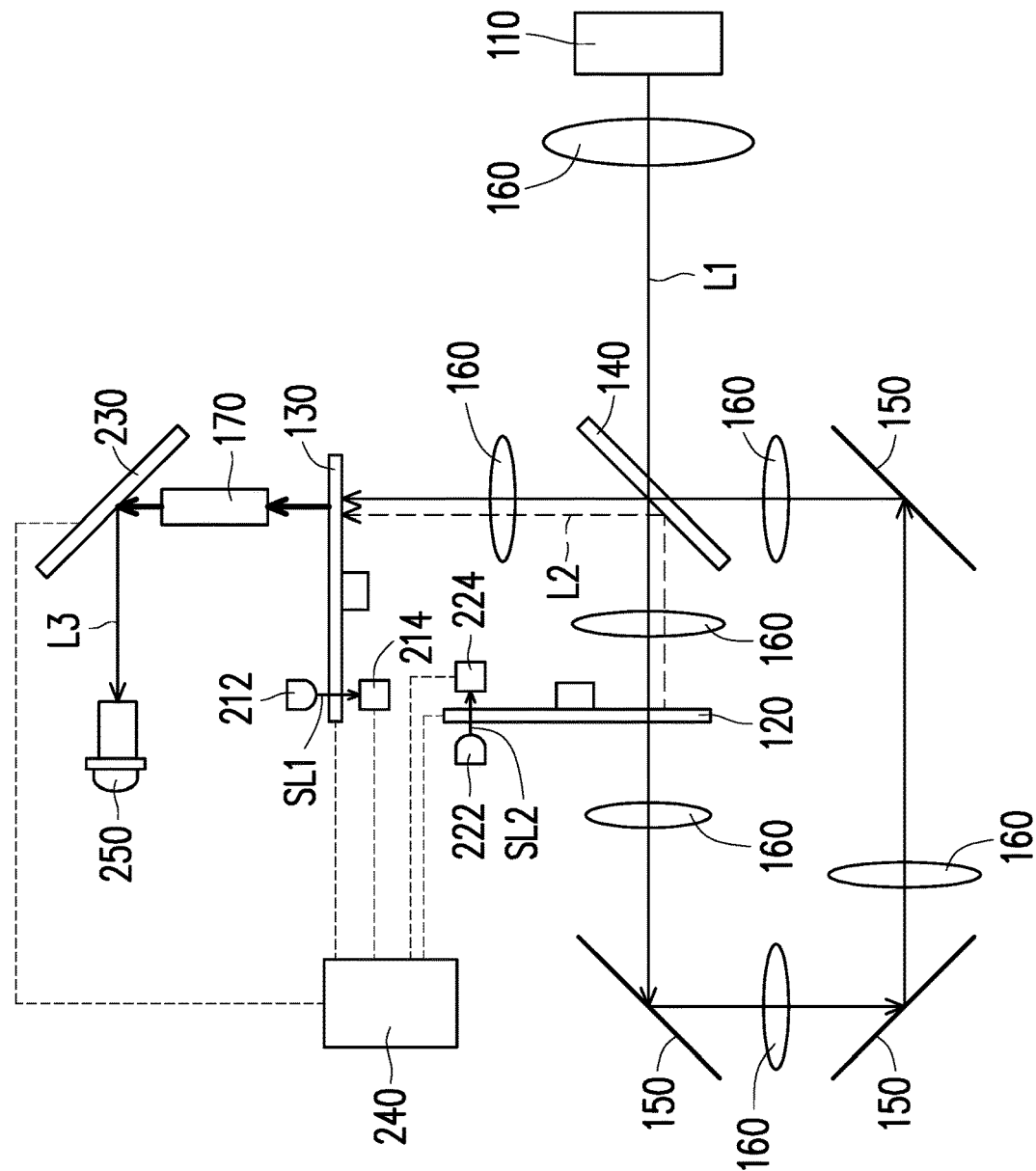
FIG. 1 is a schematic view of a projecting apparatus according to a first embodiment of the invention.
Figure 2:
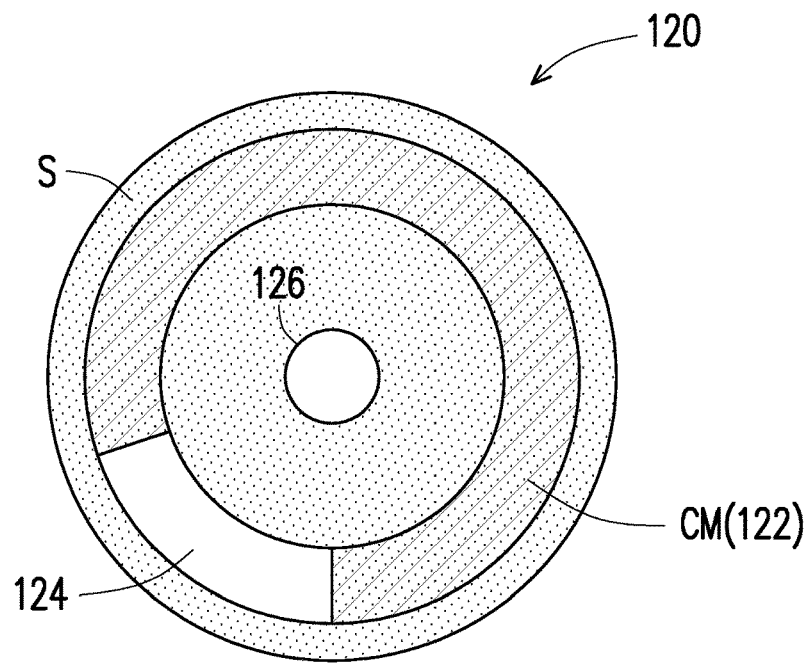
FIG. 2 is a front schematic view of the wavelength conversion element in FIG. 1.
Figure 3:
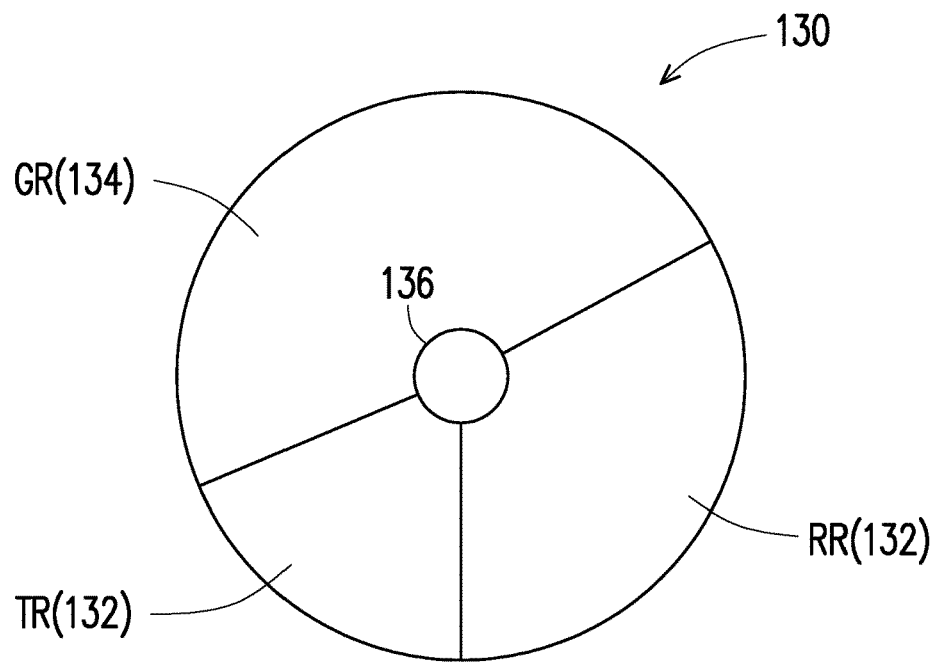
FIG. 3 is a front schematic view of the filter element in FIG. 1.

FIG. 1 is a schematic view of a projecting apparatus according to a first embodiment of the invention. FIG. 2 is a front schematic view of the wavelength conversion element in FIG. 1. FIG. 3 is a front schematic view of the filter element in FIG. 1. Referring to FIG. 1 first, the projecting apparatus 200 of the embodiment includes an illuminating system 100, a first sensing module 210, a second sensing module 220, a light valve 230, a controller 240 and a projection lens 250. The illuminating system 100 includes a light source module 110, a wavelength conversion element 120 and a filter element 130. The light source module 110 is used to emit a light beam L1. The wavelength conversion element 120 and the filter element 130 are both disposed on a transmission path of the light beam L1.

In the embodiment, the light source module 110 is a laser light emitting element including at least one laser diode chip. For example, the light source module 110 may be, for example, a blue laser diode bank, and the light beam L1 is a blue laser beam, but the invention is not limited thereto.

Referring to FIG. 1 and FIG. 2, in the embodiment, the wavelength conversion element 120 is a rotatable disk-like element, for example, a phosphor wheel. The wavelength conversion element 120 includes a wavelength conversion region 122 and a light penetration region 124, and can convert a short wavelength light beam transmitted to the wavelength conversion region 122 into a long wavelength light beam. Specifically, the wavelength conversion element 120 includes a substrate S, the substrate S has the wavelength conversion region 122 and the light penetration region 124 arranged in an annular shape, a wavelength conversion material CM is disposed in the wavelength conversion region 122, and the light penetration region 124 is, for example, a region formed by a transparent plate embedded in the substrate S or a hollow region formed in the substrate S. The substrate S is, for example, a reflective substrate. The wavelength conversion material CM is, for example, yellow phosphor, which is able to be excited by a blue light beam and output a yellow light beam. The wavelength conversion region 122 and the light penetration region 124 are suitable to rotate around a rotating shaft 126 along with the wavelength conversion element 120 so as to sequentially cut into the transmission path of the light beam L1. When the light penetration region 124 is cut into the transmission path of the light beam L1, the light beam L1 penetrates the light penetration region 124 of the wavelength conversion element 120, and when the wavelength conversion region 122 is cut into the transmission path of the light beam L1, the light beam L1 is converted into a converted light beam L2 by the wavelength conversion region 122, and the converted light beam L2 can be reflected by the substrate S of the wavelength conversion element 120. The converted light beam L2 is, for example, a yellow light beam. In other embodiments, the wavelength conversion element 120 may also include multiple wavelength conversion regions for respectively converting the light beam L1 into different color lights.

Referring to FIG. 1 and FIG. 3, in the embodiment, the filter element 130 is a rotatable disk-like element, for example a color filter wheel. The filter element 130 includes a first filter region 132 and a second filter region 134, and the first filter region 132 and the second filter region 134 are suitable to rotate around the rotating shaft 136 along with the filter element 130 so as to sequentially cut into the transmission path of the light beam L1 and the converted light beam L2 from the wavelength conversion element 120. The first filter region 132 includes, for example, a red light filter region RR and a transmissive region TR. The second filter region 134 includes, for example, a green light filter region GR. For example, the transmissive region TR allows light to pass through, and the red light filter region RR allows the light beam in a red light wavelength band to penetrate through and filter out (or reflect) the light beam in other wavelength bands, and so on. In other embodiments, a diffusion sheet, a diffusion particle or a diffusion structure is also disposed in the transmissive region TR and is used to reduce or eliminate the speckle phenomenon of the light beam L1. In detail, when the converted light beam L2 is transmitted to the red light filter region RR or the green light filter region GR, the converted light beam L2 is filtered to form a red light beam or a green light beam. When the light beam L1 is transmitted to the transmissive region TR, the light beam L1 penetrates the transmissive region TR of the filter element 130, and is, for example, a blue light beam.

Referring to FIG. 1, the light valve 230 is disposed on the transmission path of the light beam L1 (blue light beam) from the filter element 130 as well as the red light beam and green light beam formed by filtering by the filter element 130 so as to modulate the light beam L1 (blue light beam), red light beam and green light beam into an image beam L3. The projection lens 250 is disposed on the transmission path of the image beam L3 and used to project the image beam L3 to a screen (not shown) to form an image picture. After the light beams of different colors converge on the light valve 230, the light valve 230 sequentially converts the light beam L1 (blue light beam), the red light beam and the green light beam into the image beam L3 with different colors and transmits the image beam L3 to the projection lens 250, and therefore, the image picture which is generated from the image beam L3 converted by the light valve 230 and is projected by the projection lens 250 can become a colored picture.

In the embodiment, the light valve 230 is, for example, a digital micro-mirror device (DMD) or a liquid-crystal-on-silicon panel (LCOS panel). However, in other embodiments, the light valve 230 may also be a transmissive liquid crystal panel or other spatial light modulators. In the present embodiment, the projection lens 250 is, for example, a combination including one or more optical lenses having diopter, and the optical lens includes, for example, a biconcave lens, a biconvex lens, a concave-convex lens, a convex-concave lens, a plano-convex lens, a plano-concave lens, or other non-planar lenses or various combinations thereof. The invention does not limit the shape and type of the projection lens 250.

FIG. 4 is a timing diagram of signal intensity sensed by the first sensing module of FIG. 1. Referring to FIG. 1 and FIG. 4, the first sensing module 210 is disposed beside the filter element 130, and the first sensing module 210 includes a first light emitter 212 and a first light sensor 214. The first light emitter 212 is used to emit a first sensing light SL1, wherein outside the transmission path of the light beam L1 and the converted light beam L2, the first filter region 132 and the second filter region 134 are sequentially cut into a transmission path of the first sensing light SL1. The first light sensor 214 is used to detect the first sensing light SL1, wherein when the first filter region 132 of the filter element 130 is cut into the transmission path of the first sensing light SL1, the first light sensor 214 detects the first sensing light SL1 and generates a first sensing signal, and when the second filter region 134 of the filter element 130 is cut into the transmission path of the first sensing light SL1, the first light sensor 214 detects the first sensing light SL1 and generates a second sensing signal, and the first sensing signal is different from the second sensing signal.

In detail, the first light emitter 212 and the first light sensor 214 of the embodiment are respectively disposed on two opposite sides of the filter element 130, the first light emitter 212 is, for example, a laser diode or light emitting diode, and the first sensing light SL1 is, for example, red light or infrared light. When the first filter region 132 (for example, the red light filter region RR and the transmissive region TR) is cut into the transmission path of the first sensing light SL1, the first sensing light SL1 penetrates the first filter region 132 and is transmitted to the first light sensor 214, and at this time, the first light sensor 214 senses that the signal intensity of the first sensing signal is high. When the second filter region 134 (for example, the green light filter region GR) is cut into the transmission path of the first sensing light SL1, the first sensing light SL1 is filtered out (or reflected) by the second filter region 134 and does not penetrate the second filter region 134, and at this time, the first light sensor 214 senses that the signal intensity of the second sensing signal is low. For example, when the converted light beam L2 is transmitted to the green light filter region GR, the converted light beam L2 penetrates and is filtered to form a green light beam, and at this time, the red light filter region RR is cut into the transmission path of the first sensing light SL1 and the first light sensor 214 generates the first sensing signal. In other embodiments, the first sensing light SL1 may also be any color light in the visible light, and the invention is not limited thereto. For example, the first sensing light SL1 may also be green light, then the first filter region 132 may include a green light filter region GR and a transmissive region TR, and the second filter region 134 may include a red light filter region RR. It should be noted that the color light allowed to pass through the respective filter regions of the filter element 130 of the present embodiment is only exemplary, and is not intended to limit the invention. The filter element 130 may have other number of filter regions, and the invention is not limited thereto.

FIG. 5 is a timing diagram of signal intensity sensed by the second sensing module of FIG. 1. Referring to FIG. 1 and FIG. 5, the second sensing module 220 is disposed beside the wavelength conversion element 120, and the second sensing module 220 includes a second light emitter 222 and a second light sensor 224. The second light emitter 222 is used to emit a second sensing light SL2, wherein outside the transmission path of the light beam L1 and the converted light beam L2, the wavelength conversion region 122 and the light penetration region 124 are sequentially cut into a transmission path of the second sensing light SL2. The second light sensor 224 is used to detect the second sensing light SL2, wherein when the wavelength conversion region 122 is cut into the transmission path of the second sensing light SL2, the second light sensor 224 detects the second sensing light SL2 and generates a third sensing signal, and when the light penetration region 124 is cut into the transmission path of the second sensing light SL2, the second light sensor 224 detects the first sensing light SL1 and generates a fourth sensing signal, and the third sensing signal is different from the fourth sensing signal.

In detail, the second light emitter 222 and the second light sensor 224 of the present embodiment are respectively disposed on two opposite sides of the wavelength conversion element 120, the second light emitter 222 is, for example, a laser diode or light emitting diode, and the second sensing light SL2 is, for example, red light or infrared light. When the light penetration region 124 is cut into the transmission path of the second sensing light SL2, the second sensing light SL2 penetrates the light penetration region 124 and is transmitted to the second light sensor 224, and at this time, the second light sensor 224 senses that the signal intensity of the third sensing signal is high. When the wavelength conversion region 122 is cut into the transmission path of the second sensing light SL2, the second sensing light SL2 is reflected by the substrate S of the wavelength conversion element 120 and does not penetrate the wavelength conversion region 122, and at this time, the second light sensor 224 senses that the signal intensity of the fourth sensing signal is low. For example, when the light beam L1 is transmitted to the light penetration region 124, the light beam L1 penetrates the light penetration region 124, and at this time, the wavelength conversion region 122 is cut into the transmission path of the second sensing light SL2 and the second light sensor 224 generates the fourth sensing signal. In other embodiments, the second sensing light SL2 may also be any color light in the visible light, and the invention is not limited thereto.

Wherein, in the first sensing signal and the second sensing signal, the signal intensity of the one with higher signal intensity is a1, the signal intensity of the one with lower signal intensity is b1, and the first sensing signal and the second sensing signal meet (a1−b1)/a1>20%. In the third sensing signal and the fourth sensing signal, the signal intensity of the one with higher signal intensity is a2, the signal intensity of the one with lower signal intensity is b2, and the third sensing signal and the fourth sensing signal meet (a2−b2)/a2>20%.

In the present embodiment, the controller 240 is respectively electrically connected to the first sensing module 210, the second sensing module 220, the wavelength conversion element 120, the filter element 130 and the light valve 230, and the controller 240 synchronizes the wavelength conversion element 120, the filter element 130 and the light valve 230 by the first sensing signal to the fourth sensing signal from the first light sensor 214 and the second light sensor 224. Specifically, the controller 240 may pre-store information about the angles and order of various regions of the wavelength conversion element 120 and the filter element 130, and when the wavelength conversion element 120 and the filter element 130 rotate to a specific position, the first light sensor 214 and the second light sensor 224 may respectively transmit synchronization signals to the controller 240. The controller 240 can obtain the rotation speed of the wavelength conversion element 120 and the filter element 130 by the interval time of the synchronization signals, and can obtain the rotation position (the current located region) of the wavelength conversion element 120 and the filter element 130 by matching the information about the pre-stored angles and order of regions. Therefore, the controller 240 may respectively transmit control signals to the wavelength conversion element 120, the filter element 130 and the light valve 230 according to the above-mentioned information so as to synchronize the three.

Through the above disposition, the projecting apparatus 200 according to the embodiments of the invention can detect the rotation position and rotation speed of the wavelength conversion element 120 and filter element 130 in a simple and accurate manner without additionally sticking the light-absorbing tape or performing additional correction, thereby reducing the production processes and production cost.

In an embodiment, the controller 240 is, for example, a central processing unit (CPU), a microprocessor, a digital signal processor (DSP), a programmable controller, a programmable logic device (PLD) or other similar devices or a combination thereof, and the invention is not limited thereto. Besides, in an embodiment, the functions of the controller 240 may be implemented as a plurality of program codes. These program codes are stored in a memory, and executed by the controller 240. Alternatively, in an embodiment, each of the functions of the controller 240 may be implemented as one or more circuits. The invention is not intended to limit whether each of the functions of the controller 240 is implemented by ways of software or hardware.

In the present embodiment, the illuminating system 100 may further include a light combining unit 140 and multiple reflecting mirrors 150. The light combining unit 140 is located between the light source module 110 and the wavelength conversion element 120, and located on the transmission path of the light beam L1 emitted from the light source module 110, the converted light beam L2 and the light beam L1 penetrating the wavelength conversion element 120. The multiple reflecting mirrors 150 are located on the transmission path of the light beam L1 penetrating the wavelength conversion element 120, and are used to transmit the light beam L1 penetrating the wavelength conversion element 120 to the light combining unit 140. Specifically, the light combining unit 140 may be a dichroic mirror (DM) or a dichroic prism, and may provide different optical effects for light beams of different colors. For example, in the present embodiment, the light combining unit 140 allows, for example, the light beam L1 to penetrate, and reflect the converted light beam L2. Therefore, the light combining unit 140 may transmit the light beam L1 from the light source module 110 to the wavelength conversion element 120, and after the multiple reflecting mirrors 150 transmit the light beam L1 penetrating the wavelength conversion element 120 to the light combining unit 140, and the light combining unit 140 may combine the converted light beam L2 reflected from the wavelength conversion element 120 and the light beam L1 penetrating the wavelength conversion element 120.

Besides, the illuminating system 100 may further include multiple lenses 160 and a light homogenizing element 170 disposed on the transmission path of the light beam L1. The multiple lenses 160 are used for converging, diverging, collimating the light beam or adjusting the light beam path inside the illuminating system 100. The light homogenizing element 170 is used for homogenizing the light beam from the filter element 130 and transmitting it to the light valve 230. In the present embodiment, the light homogenizing element 170 is, for example, an integration rod, but is not limited thereto.

It should be noted here that the following embodiments use partial content of the foregoing embodiments, and the description of the same technical content is omitted. For the same component names, reference may be made to the partial content of the foregoing embodiments, and the following embodiments are not described repeatedly.

Figure 6:
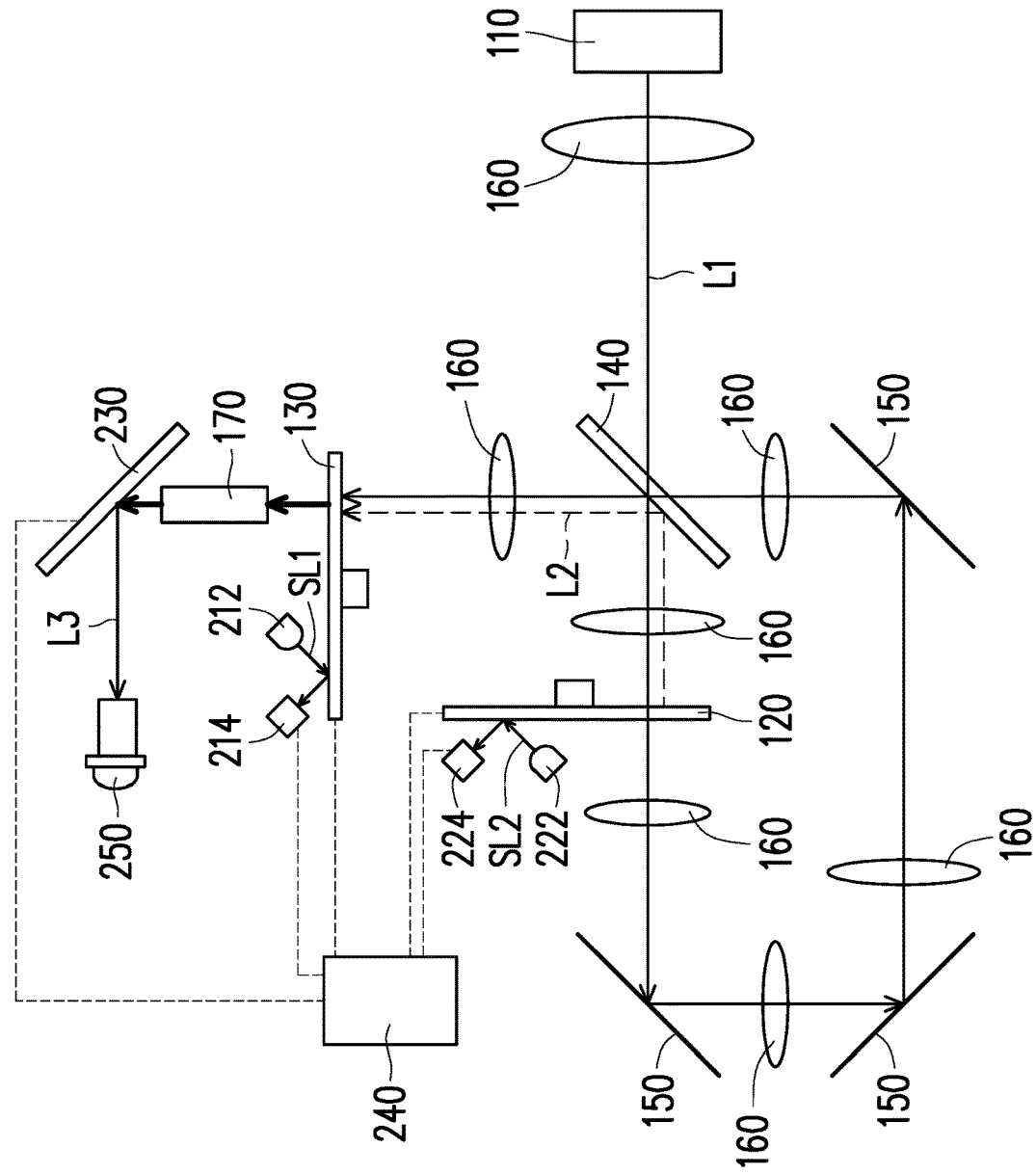
FIG. 6 is a schematic view of a projecting apparatus according to another embodiment of the invention.
Figure 7:
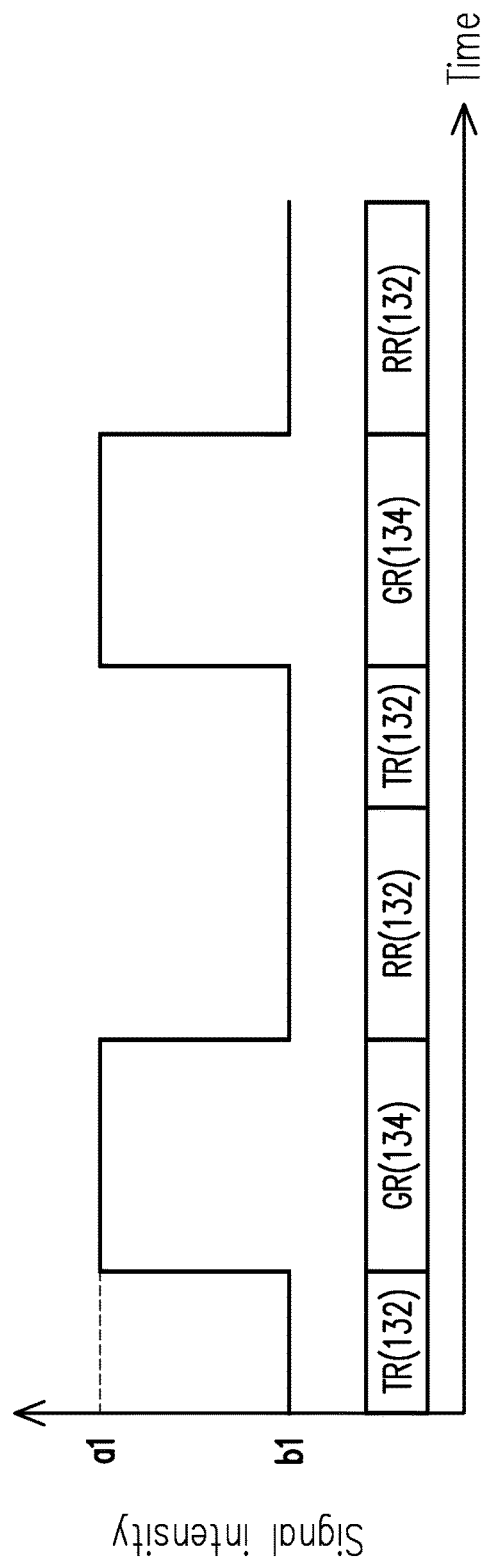
FIG. 7 is a timing diagram of signal intensity sensed by the first sensing module of FIG. 6.
Figure 8:
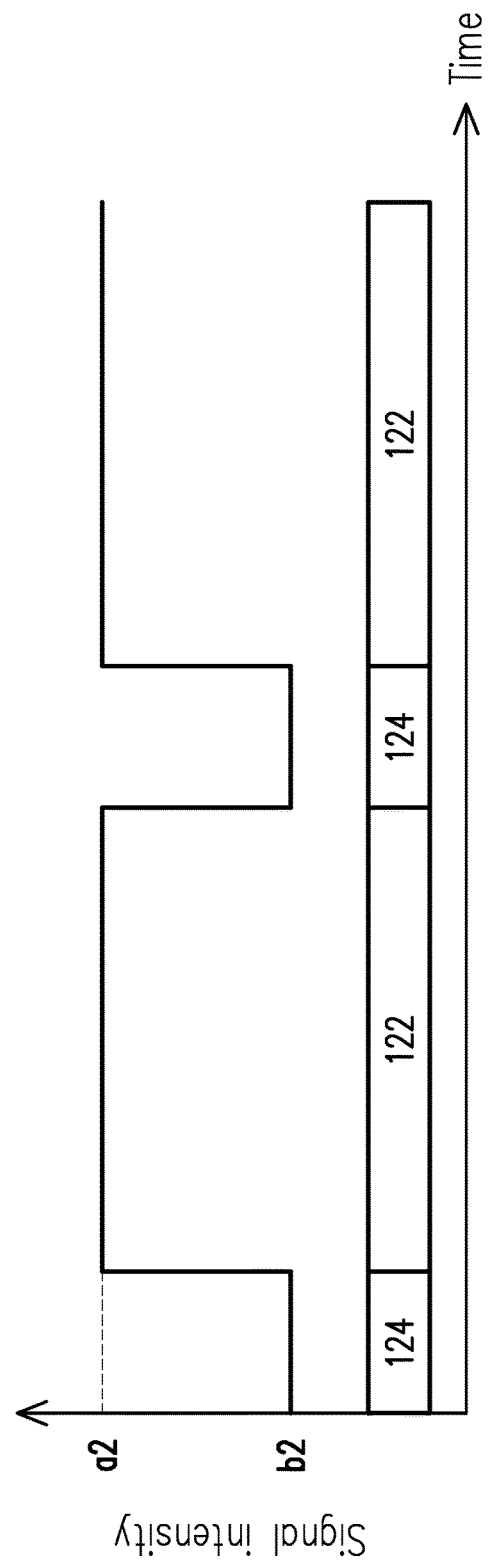
FIG. 8 is a timing diagram of signal intensity sensed by the second sensing module of FIG. 6.

FIG. 6 is a schematic view of a projecting apparatus according to another embodiment of the present invention. FIG. 7 is a timing diagram of signal intensity sensed by the first sensing module of FIG. 6. FIG. 8 is a timing diagram of signal intensity sensed by the second sensing module of FIG. 6. Referring to FIG. 6 first, the projecting apparatus 200a of the present embodiment is substantially similar to the projecting apparatus 200 in FIG. 1, and the main difference in architecture lies in the disposition manner of the first sensing module and the second sensing module. The first light emitter 212 and the first light sensor 214 in FIG. 1 are respectively disposed on two opposite sides of the filter element 130, and the second light emitter 222 and the second light sensor 224 are respectively disposed on two opposite sides of the wavelength conversion element 120. The first light emitter 212 and the first light sensor 214 in FIG. 6 are disposed on the same side of the filter element 130, and the second light emitter 222 and the second light sensor 224 are disposed on the same side of the wavelength conversion element 120. It should be noted that the red light filter region RR (or green light filter region GR) of the filter element 130 in the present embodiment can allow the light beam in the red light (or green light) wavelength band to penetrate and reflect the light beams in other wavelength bands.

Referring to FIG. 6 and FIG. 7, when the first filter region 132 (for example, the red light filter region RR and the transmissive region TR) of the filter element 130 is cut into the transmission path of the first sensing light SL1, the first sensing light SL1 penetrates the first filter region 132 and is not transmitted to the first light sensor 214, and at this time, the first light sensor 214 senses that the signal intensity of the first sensing signal is low. When the second filter region 134 (for example, the green light filter region GR) of the filter element 130 is cut into the transmission path of the first sensing light SL1, the first sensing light SL1 is reflected to the first light sensor 214 by the second filter region 134, and at this time, the first light sensor 214 senses that the signal intensity of the first sensing signal is high. In the embodiment of FIG. 6, the situation that the first sensing module 210 is disposed on the back side of the filter element 130 is taken as an example. In other embodiments, the first sensing module 210 may also be disposed on the front side of the filter element 130.

Referring to FIG. 6 and FIG. 8, when the light penetration region 124 of the wavelength conversion element 120 is cut into the transmission path of the second sensing light SL2, the second sensing light SL2 penetrates the light penetration region 124 and is not transmitted to the second light sensor 224, and at this time, the second light sensor 224 senses that the signal intensity of the third sensing signal is low. When the wavelength conversion region 122 of the wavelength conversion element 120 is cut into the transmission path of the second sensing light SL2, the second sensing light SL2 is reflected to the second light sensor 224 by the substrate S of the wavelength conversion element 120, and at this time, the second light sensor 224 senses that the signal intensity of the fourth sensing signal is high. In the embodiment of FIG. 6, the situation that the second sensing module 220 is disposed on the back side of the wavelength conversion element 120 is taken as an example. In other embodiments, the second sensing module 220 may also be disposed on the front side of the wavelength conversion element 120.

The first light emitter 212 and the first light sensor 214 of the present embodiment are disposed on the same side of the filter element 130, and the second light emitter 222 and the second light sensor 224 are also disposed on the same side of the wavelength conversion element 120. In other embodiments, the first light emitter 212 and the first light sensor 214 can be disposed on the same side of the filter element 130, and the second light emitter 222 and the second light sensor 224 are disposed on two opposite sides of the wavelength conversion element 120. Alternatively, the first light emitter 212 and the first light sensor 214 can be disposed on two opposite sides of the filter element 130, the second light emitter 222 and the second light sensor 224 are disposed on the same side of the wavelength conversion element 120, and the present invention is not limited thereto.

Figure 9:
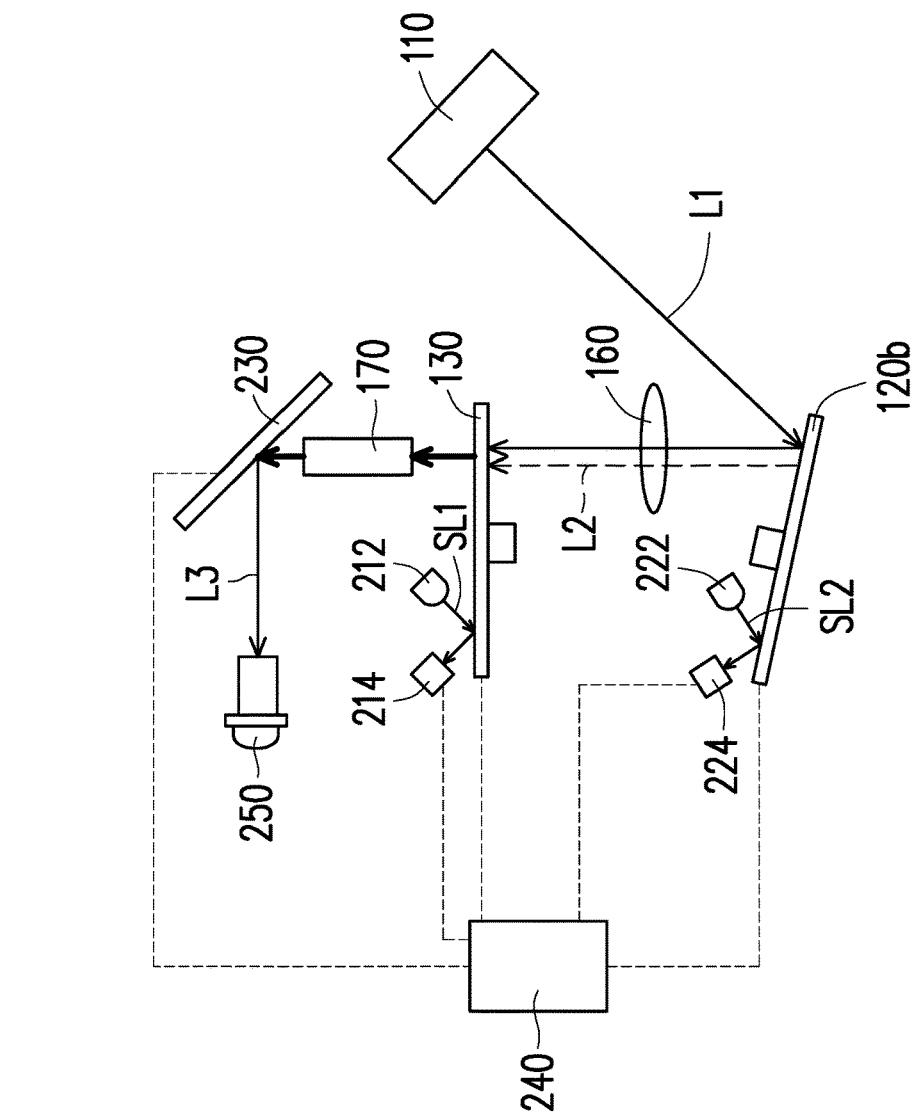
FIG. 9 is a schematic view of a projecting apparatus according to another embodiment of the invention.
Figure 10:
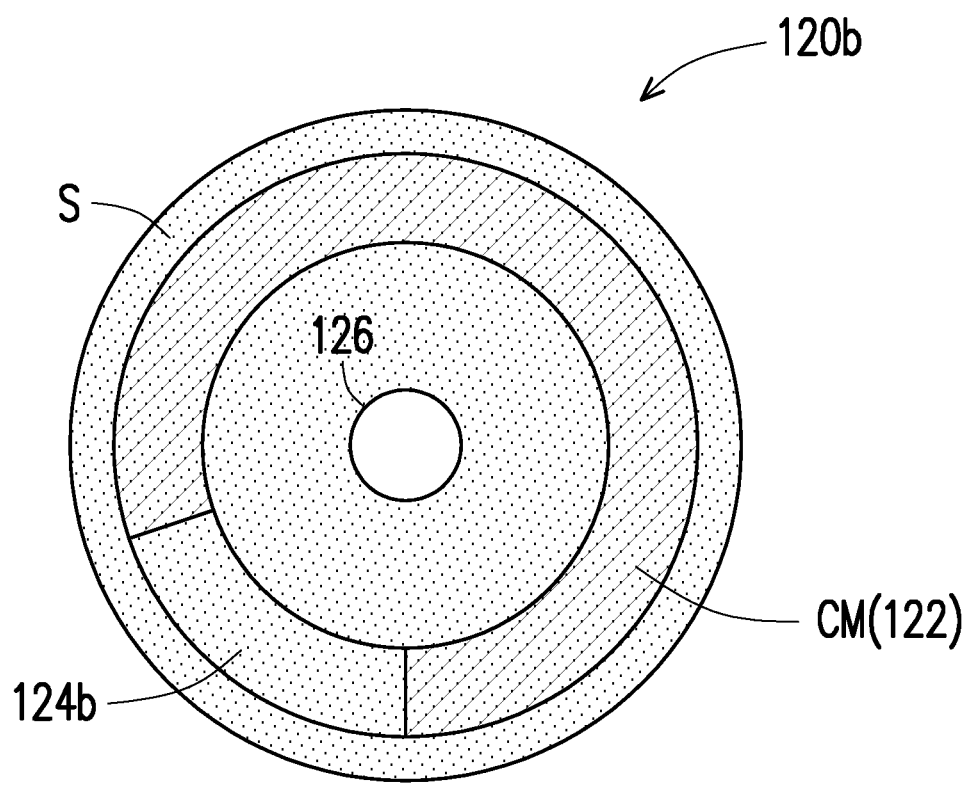
FIG. 10 is a front schematic view of the wavelength conversion element in FIG. 9.
Figure 11:
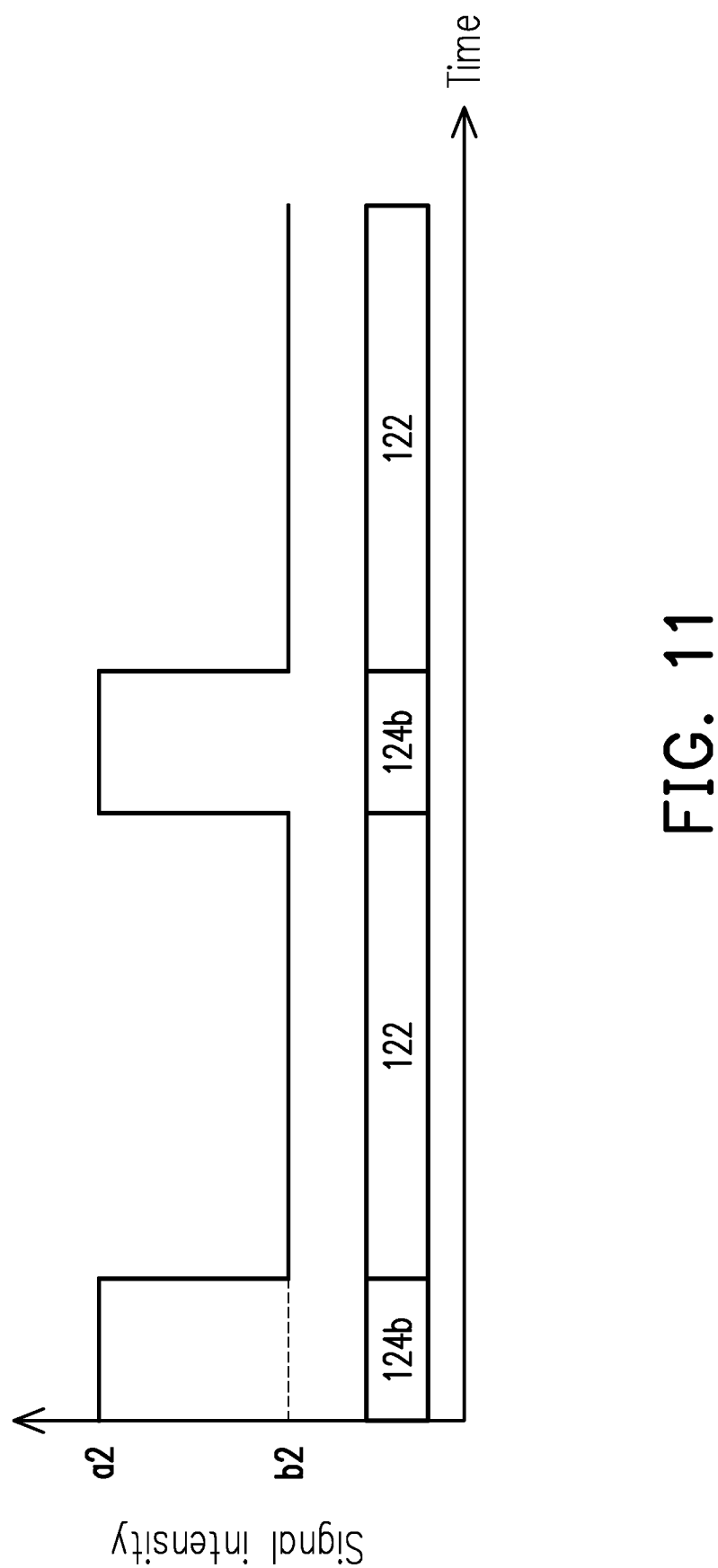
FIG. 11 is a timing diagram of signal intensity sensed by the second sensing module of FIG. 9.

FIG. 9 is a schematic view of a projecting apparatus according to another embodiment of the invention. FIG. 10 is a front schematic view of the wavelength conversion element in FIG. 9. FIG. 11 is a timing diagram of signal intensity sensed by the second sensing module of FIG. 9. The same component names and component numbers in the present embodiment may refer to partial content of the foregoing embodiments, and details are not repeated herein. Referring to FIG. 9 and FIG. 10, in the projecting apparatus 200b of the present embodiment, a first side (for example, the front side) of the wavelength conversion element 120b of the illuminating system 100b includes a wavelength conversion region 122 and a light reflection region 124b, and the wavelength conversion region 122 and the light reflection region 124b are sequentially cut into the transmission path of the light beam L1 from the light source module 110. In the present embodiment, the light reflection region 124b is, for example, a portion of the reflective substrate S.

The second light emitter 222 and the second light sensor 224 of the present embodiment are disposed on the first side (for example, the front side) of the wavelength conversion element 120b, when the wavelength conversion region 122 is cut into the transmission path of the second sensing light SL2 emitted from the second light emitter 222, the second sensing light SL2 is diffusely reflected by the wavelength conversion material CM of the wavelength conversion region 122, so that the second light sensor 224 senses that the intensity of the third sensing signal is low, and when the light reflection region 124b is cut into the transmission path of the second sensing light SL2, the second sensing light SL2 is reflected to the second light sensor 224 by the light reflection region 124b so that the second light sensor 224 senses that the intensity of the fourth sensing signal is high.

It should be noted that since the reflection of the light in the light reflection region 124b is close to mirror reflection, the second sensing light SL2 may be mostly transmitted to the second light sensor 224 so that the second light sensor 224 can sense the second sensing light SL2 and generate the fourth sensing signal with a higher signal intensity. However, the reflection of the light in the wavelength conversion region 122 is close to diffuse reflection, and therefore, in comparison with the mirror reflection, the second light sensor 224 senses the second sensing light SL2 and generates the third sensing signal with a lower signal intensity.

Figure 12:
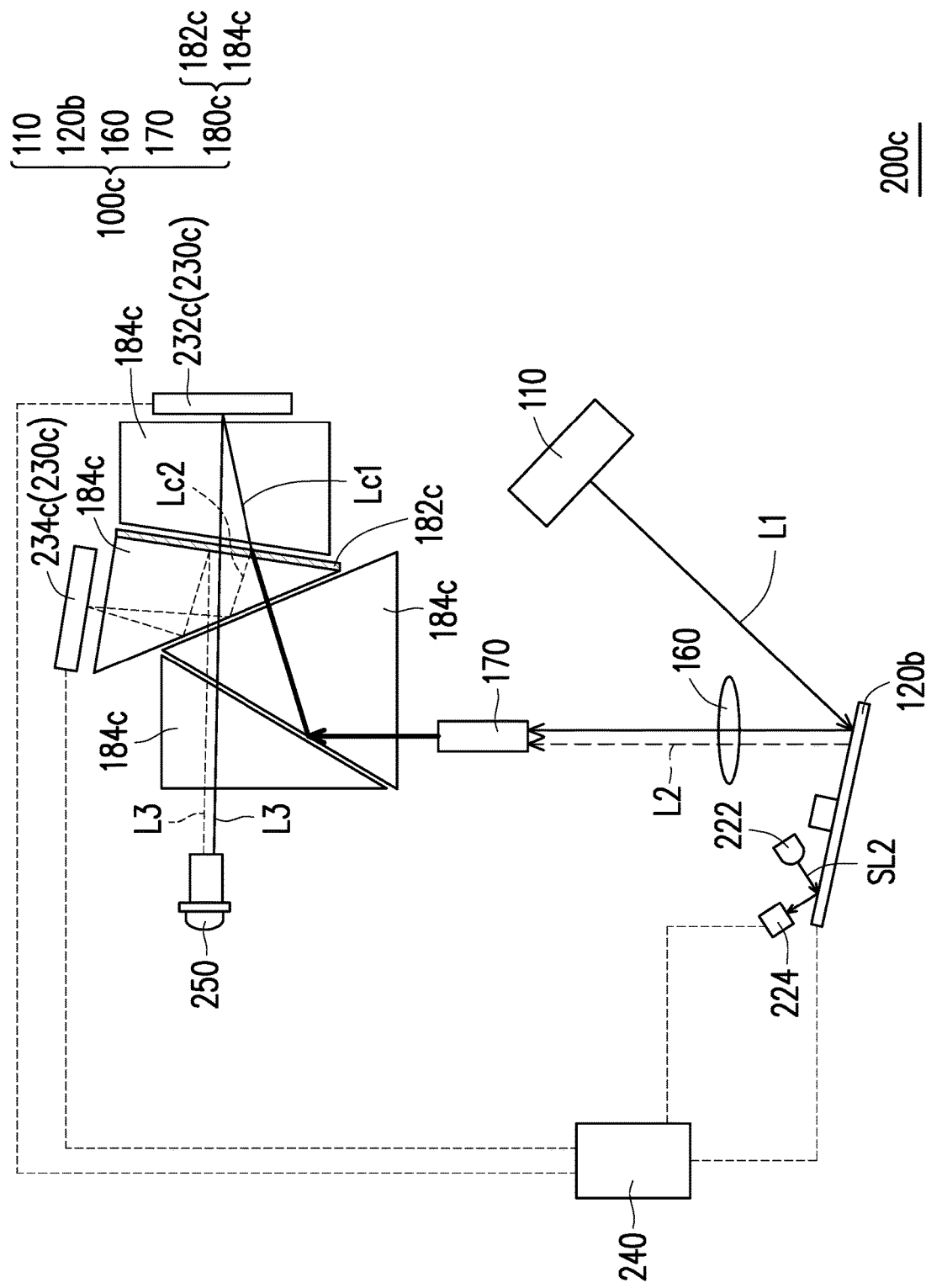
FIG. 12 is a schematic view of a projecting apparatus according to another embodiment of the invention.

FIG. 12 is a schematic view of a projecting apparatus according to another embodiment of the present invention. Referring to FIG. 12, the projecting apparatus 200c of the present embodiment is substantially similar to the projecting apparatus 200b in FIG. 9. The main difference is that the present embodiment does not have a filter element, and the light valve module 230c of the present embodiment includes a first light valve 232c and a second light valve 234c. Besides, the illuminating system 100c further includes a light splitting module 180c, the light splitting module 180c is disposed on the transmission path of the light beam L1 and the converted light beam L2 from the wavelength conversion element 120b, and the light splitting module 180c is used to split the light beam L1 and the converted light beam L2 into a first light beam Lc1 and a second light beam Lc2 as well as transmitting the first light beam Lc1 and the second light beam Lc2 to the first light valve 232c and the second light valve 234c respectively. Specifically, the light splitting module 180c includes, for example, a light splitting film 182c and multiple prisms 184c. The light splitting film 182c is located on the surface of one of the prisms 184c. When the light beam L1 and the converted light beam L2 are transmitted to the light splitting module 180c, the light beam L1 and the converted light beam L2 undergo total internal reflection inside the light splitting module 180c so as to be transmitted to the light splitting film 182c. The light splitting film 182c is used to split the light beam L1 and the converted light beam L2 into the first light beam Lc1 and the second light beam Lc2, and transmitting the first light beam Lc1 and the second light beam Lc2 to the first light valve 232c and the second light valve 234c respectively. The first light valve 232c and the second light valve 234c respectively modulate the first light beam Lc1 and the second light beam Lc2 into an image beam L3.

For example, the light splitting film 182c is, for example, a dichroic element designed to reflect the green light beam and allow the blue light beam and the red light beam to pass through. Therefore, when the light beam L1 and the converted light beam L2 are transmitted to the light splitting film 182c of the light splitting module 180c, the light beam L1 (for example, the blue light beam) and the light beam having the red light wavelength band in the converted light beam L2 may pass through the light splitting film 182c to form the first light beam Lc1, and the light beam having the green light wavelength band in the converted light beam L2 is reflected by the light splitting film 182c to form the second light beam Lc2. In other embodiments, the light splitting film 182c may also be a dichroic element designed to reflect the red light beam and allow the blue light beam and the green light beam to pass through. Therefore, when the light beam L1 and the converted light beam L2 are transmitted to the light splitting film 182c of the light splitting module 180c, the light beam L1 (for example, the blue light beam) and the light beam having the green light wavelength band in the converted light beam L2 may pass through the light splitting film 182c to form the first light beam Lc1, and the light beam having the red light wavelength band in the converted light beam L2 is reflected by the light splitting film 182c to form the second light beam Lc2.

In the present embodiment, the controller 240 is respectively electrically connected to the second sensing module 220, the wavelength conversion element 120b and the light valve module 230c, and the controller 240 is used for synchronizing the wavelength conversion element 120b and the light valve module 230c by the third sensing signal and the fourth sensing signal.

Figure 13:
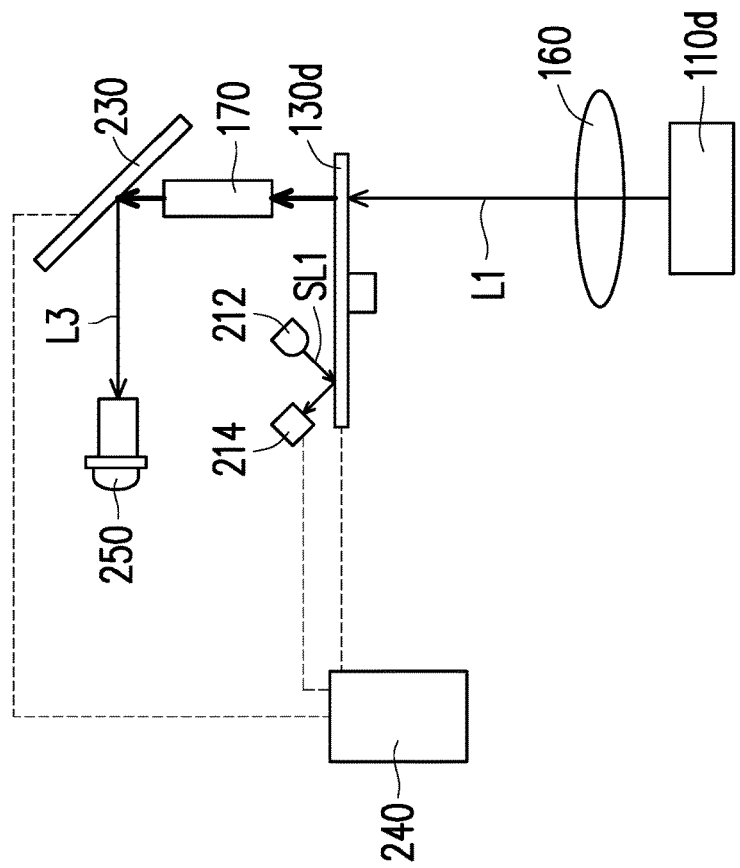
FIG. 13 is a schematic view of a projecting apparatus according to another embodiment of the invention.
Figure 14:
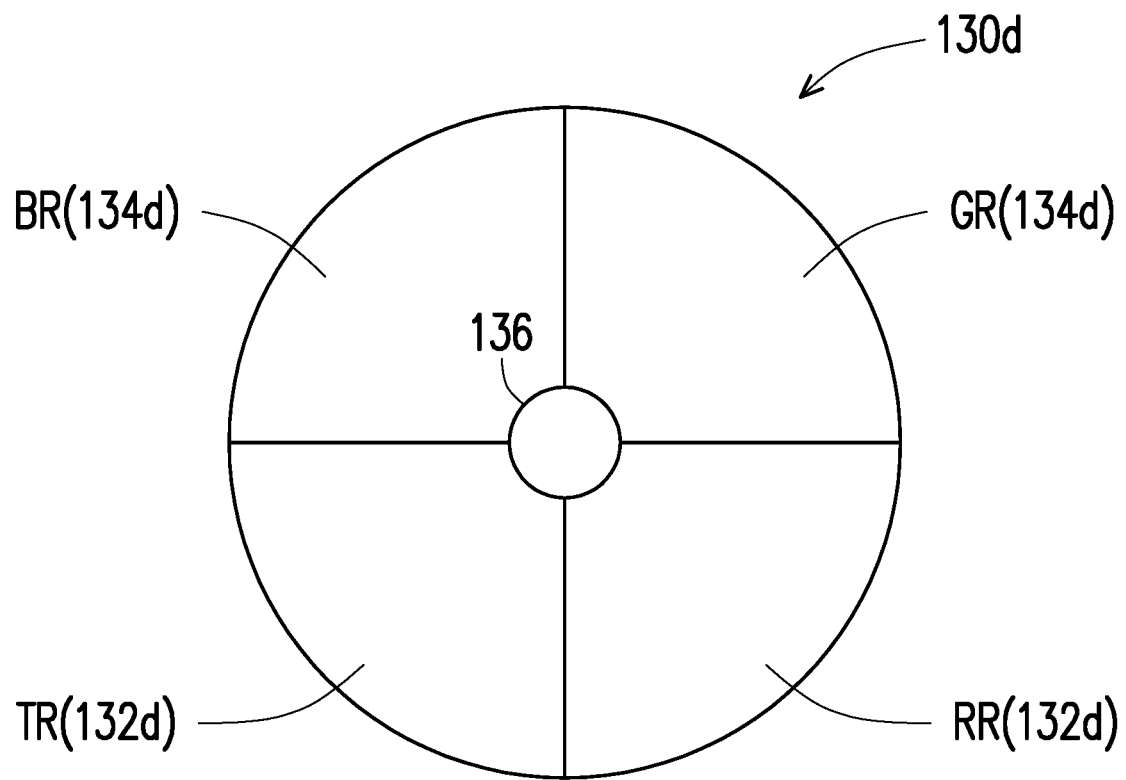
FIG. 14 is a front schematic view of the filter element in FIG. 13.

FIG. 13 is a schematic view of a projecting apparatus according to another embodiment of the invention. FIG. 14 is a front schematic view of the filter element in FIG. 13. Referring to FIG. 13 and FIG. 14, the same component names and component numbers in the present embodiment may refer to partial content of the foregoing embodiments, and details are not repeated herein. The light source module 110d of the illuminating system 100d of the projecting apparatus 200d of the present embodiment is, for example, an ultrahigh pressure mercury lamp (UHP lamp), a metal halide lamp or a xenon lamp. The first filter region 132d of the filter element 130d includes, for example, a red light filter region RR and a transmissive region TR. The second filter region 134d includes, for example, a green light filter region GR and a blue light filter region BR, so that the color lights having different wavelength bands in the light beam L1 from the light source module 110d are filtered out from the filter element 130d.

The first light emitter 212 and the first light sensor 214 of the present embodiment are disposed on the same side of the filter element 130d. When the first filter region 132d (for example, the red light filter region RR and the transmissive region TR) is cut into the transmission path of the first sensing light SL1, the first sensing light SL1 penetrates the first filter region 132d and is not transmitted to the first light sensor 214, and at this time, the first light sensor 214 senses that the signal intensity of the first sensing signal is low. When the second filter region 134d (for example, the green light filter region RR and the blue light filter region BR) is cut into the transmission path of the first sensing light SL1, the first sensing light SL1 is reflected to the first light sensor 214 by the second filter region 134d, and at this time, the first light sensor 214 senses that the signal intensity of the second sensing signal is high. Since the sensing manner of the first sensing module 210 in the present embodiment is similar to the sensing manner of the first sensing module 210 in FIG. 6, for the timing diagram of signal intensity sensed by the first sensing module 210 of the present embodiment, reference may be made to the foregoing embodiment, and the illustration is omitted. In the embodiment of FIG. 13, the situation that the first sensing module 210 is disposed on the back side of the filter element 130d is taken as an example. In other embodiments, the first sensing module 210 may also be disposed on the front side of the filter element 130d.

In other embodiments, the first light emitter 212 and the first light sensor 214 may be respectively disposed on two opposite sides of the filter element 130d. When the first filter region 132d (for example, the red light filter region RR and the transmissive region TR) is cut into the transmission path of the first sensing light SL1, the first sensing light SL1 penetrates the first filter region 132d and is transmitted to the first light sensor 214, and at this time, the first light sensor 214 senses that the signal intensity of the first sensing signal is high. When the second filter region 134d (for example, the green light filter region RR and the blue light filter region BR) is cut into the transmission path of the first sensing light SL1, the first sensing light SL1 is filtered out (or reflected)

by the second filter region 134d and does not penetrate the second filter region 134d, and at this time, the first light sensor 214 senses that the signal intensity of the first sensing signal is low. Since the disposition manner and sensing manner of the first sensing module of the present embodiment are similar to the disposition manner and sensing manner of the first sensing module in FIG. 1, for the disposition manner of the first sensing module of the present embodiment and the timing diagram of signal intensity sensed by the first sensing module, reference may be made to the foregoing embodiment, and the illustration is omitted.

In the present embodiment, the controller 240 is respectively electrically connected to the first sensing module 210, the filter element 130d and the light valve 230, and the controller 240 is used for synchronizing the filter element 130d and the light valve 230 by the first sensing signal and the second sensing signal.

Based on the above, in the projecting apparatus according to the embodiments of the present invention, the sensing module is disposed beside the wavelength conversion element or the filter element, and the sensing light emitted by the sensing module is sequentially cut into different regions of the wavelength conversion element or the filter element. Since the sensing module may sense different sensing signals in the different regions, the rotation position and rotation speed of the wavelength conversion element or the filter element can be determined through the difference of the sensing signals. Thus, the projecting apparatus according to the embodiments of the present invention can detect the rotation position and rotation speed of the wavelength conversion element and the filter element in a simple and accurate manner without additionally sticking the light-absorbing tape or performing additional correction, thereby reducing the production processes and production cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projecting apparatus, comprising: an illuminating system, a first sensing module, a light valve, a controller and a projection lens; wherein
    the illuminating system comprises a light source module and a filter element;
        the light source module is used to emit a light beam; and
        the filter element comprises a first filter region and a second filter region, and the first filter region and the second filter region are sequentially cut into a transmission path of the light beam;
    the first sensing module is disposed beside the filter element, and the first sensing module comprises a first light emitter and a first light sensor;
        the first light emitter is used to emit a first sensing light, wherein outside the transmission path of the light beam, the first filter region and the second filter region are sequentially cut into a transmission path of the first sensing light; and
        the first light sensor is used to detect the first sensing light, wherein when the first filter region is cut into the transmission path of the first sensing light, the first light sensor detects the first sensing light and generates a first sensing signal, and when the second filter region is cut into the transmission path of the first sensing light, the first light sensor detects the first sensing light and generates a second sensing signal, and the first sensing signal is different from the second sensing signal;
    the light valve is disposed on the transmission path of the light beam from the filter element to modulate the light beam into an image beam;
    the controller is respectively electrically connected to the first sensing module, the filter element and the light valve, and the controller is used to synchronize the filter element with the light valve by using the first sensing signal and the second sensing signal; and
    the projection lens is disposed on a transmission path of the image beam.

2. The projecting apparatus according to claim 1, wherein the first light emitter and the first light sensor are respectively disposed on two opposite sides of the filter element, when the first filter region is cut into the transmission path of the first sensing light, the first sensing light penetrates the first filter region and is transmitted to the first light sensor, and when the second filter region is cut into the transmission path of the first sensing light, the first sensing light does not penetrate the second filter region.

3. The projecting apparatus according to claim 1, wherein the first light emitter and the first light sensor are disposed on a same side of the filter element, when the first filter region is cut into the transmission path of the first sensing light, the first sensing light penetrates the first filter region, and when the second filter region is cut into the transmission path of the first sensing light, the first sensing light is reflected to the first light sensor by the second filter region.

4. The projecting apparatus according to claim 1, wherein in the first sensing signal and the second sensing signal, the signal intensity of the one with higher signal intensity is a, the signal intensity of the one with lower signal intensity is b, and the first sensing signal and the second sensing signal meet (a−b)/a>20%.

5. The projecting apparatus according to claim 1, wherein the illuminating system further comprises a wavelength conversion element, the wavelength conversion element comprises a wavelength conversion region and a light penetration region, and the wavelength conversion region and the light penetration region are sequentially cut into the transmission path of the light beam, wherein the projecting apparatus further comprises a second sensing module disposed beside the wavelength conversion element, and the second sensing module comprises a second light emitter and a second light sensor;
   the second light emitter is used to emit a second sensing light, wherein outside the transmission path of the light beam, the wavelength conversion region and the light penetration region are sequentially cut into a transmission path of the second sensing light; and
   the second light sensor is used to detect the second sensing light, wherein when the wavelength conversion region is cut into the transmission path of the second sensing light, the second light sensor detects the second sensing light and generates a third sensing signal, and when the light penetration region is cut into the transmission path of the second sensing light, the second light sensor detects the second sensing light and generates a fourth sensing signal, and the third sensing signal is different from the fourth sensing signal,
   wherein the controller is further electrically connected to the wavelength conversion element and the second sensing module, the controller is used to synchronize the filter element, the wavelength conversion element and the light valve by the first sensing signal to the fourth sensing signal.

6. The projecting apparatus according to claim 5, wherein the second light emitter and the second light sensor are respectively disposed on two opposite sides of the wavelength conversion element, when the light penetration region is cut into the transmission path of the second sensing light, the second sensing light penetrates the light penetration region and is transmitted to the second light sensor, and when the wavelength conversion region is cut into the transmission path of the second sensing light, the second sensing light does not penetrate the wavelength conversion region.

7. The projecting apparatus according to claim 5, wherein the second light emitter and the second light sensor are disposed on a same side of the wavelength conversion element, when the light penetration region is cut into the transmission path of the second sensing light, the second sensing light penetrates the light penetration region, and when the wavelength conversion region is cut into the transmission path of the second sensing light, the second sensing light is reflected to the second light sensor by the wavelength conversion region.

8. The projecting apparatus according to claim 1, wherein the first sensing light comprises at least one of visible light and infrared light.

9. The projecting apparatus according to claim 1, wherein the illuminating system further comprises a light homogenizing element used to homogenize and transmit the light beam from the filter element to the light valve.

10. A projecting apparatus, comprising: an illuminating system, a first sensing module, a light valve module, a controller and a projection lens; wherein
   the illuminating system comprises a light source module and a wavelength conversion element;
   the light source module is used to emit a light beam; and
   the wavelength conversion element comprises a wavelength conversion region and a light reflection region disposed at a first side thereof, and the wavelength conversion region and the light reflection region are sequentially cut into a transmission path of the light beam;
   the first sensing module is disposed beside the wavelength conversion element, and the first sensing module comprises a first light emitter and a first light sensor;
   the first light emitter is used to emit a first sensing light, wherein outside the transmission path of the light beam, the wavelength conversion region and the light reflection region are sequentially cut into a transmission path of the first sensing light; and
   the first light sensor is used to detect the first sensing light, wherein when the wavelength conversion region is cut into the transmission path of the first sensing light, the first light sensor detects the first sensing light and generates a first sensing signal, and when the light reflection region is cut into the transmission path of the first sensing light, the first light sensor detects the first sensing light and generates a second sensing signal, and the first sensing signal is different from the second sensing signal;
   the light valve module is disposed on the transmission path of the light beam from the wavelength conversion element to modulate the light beam into an image beam;
   the controller is respectively electrically connected to the first sensing module, the wavelength conversion element and the light valve module, and the controller is used to synchronize the wavelength conversion element with the light valve module by using the first sensing signal and the second sensing signal; and
   the projection lens is disposed on a transmission path of the image beam.

11. The projecting apparatus according to claim 10, the first light emitter and the first light sensor are disposed on the first side of the wavelength conversion element, when the wavelength conversion region is cut into the transmission path of the first sensing light, the first sensing light is scattered by the wavelength conversion region so that the signal intensity of the first sensing signal detected by the first light sensor is low, and when the light reflection region is cut into the transmission path of the first sensing light, the first sensing light is reflected to the first light sensor by the light reflection region so that the signal intensity of the second sensing signal detected by the first light sensor is high.

12. The projecting apparatus according to claim 10, wherein in the first sensing signal and the second sensing signal, the signal intensity of the one with higher signal intensity is a, the signal intensity of the one with lower signal intensity is b, and the first sensing signal and the second sensing signal meet (a-b)/a>20%.

13. The projecting apparatus according to claim 10, wherein the illuminating system further comprises a filter element, the filter element comprises a first filter region and a second filter region, and the first filter region and the second filter region are sequentially cut into the transmission path of the light beam, wherein the projecting apparatus further comprises a second sensing module disposed beside the filter element, and the second sensing module comprises a second light emitter and a second light sensor;

the second light emitter is used to emit a second sensing light, wherein outside the transmission path of the light beam, the first filter region and the second filter region are sequentially cut into a transmission path of the second sensing light; and the second light sensor is used to detect the second sensing light, wherein when the first filter region is cut into the transmission path of the second sensing light, the second light sensor detects the second sensing light and generates a third sensing signal, and when the second filter region is cut into the transmission path of the second sensing light, the second light sensor detects the second sensing light and generates a fourth sensing signal, and the third sensing signal is different from the fourth sensing signal, wherein the controller is further electrically connected to the filter element and the second sensing module, and the controller is used to synchronize the filter element, the wavelength conversion element and the light valve module by the first sensing signal to the fourth sensing signal.

14. The projecting apparatus according to claim 13, wherein the second light emitter and the second light sensor are respectively disposed on two opposite sides of the filter element, when the first filter region is cut into the transmission path of the second sensing light, the second sensing light penetrates the first filter region and is transmitted to the first light sensor, and when the second filter region is cut into the transmission path of the second sensing light, the second sensing light does not penetrate the second filter region.

15. The projecting apparatus according to claim 13, wherein the second light emitter and the second light sensor are disposed on a same side of the filter element, when the first filter region is cut into the transmission path of the second sensing light, the second sensing light penetrates the first filter region, and when the second filter region is cut into the transmission path of the second sensing light, the second sensing light is reflected to the second light sensor by the second filter region.

16. The projecting apparatus according to claim 13, wherein the illuminating system further comprises a light homogenizing element used to homogenize and transmit the light beam from the filter element to the light valve module.

17. The projecting apparatus according to claim 10, wherein when the light penetration region is cut into the transmission path of the light beam, the light beam penetrates the wavelength conversion element, and when the wavelength conversion region is cut into the transmission path of the light beam, the light beam is converted into a converted light beam by the wavelength conversion region, wherein the light valve module comprises a first light valve and a second light valve, the illuminating system further comprises a light splitting module, the light splitting module is disposed on the transmission path of the light beam and the converted light beam from the wavelength conversion element, the light splitting module is used to split the light beam and the converted light beam into a first light beam and a second light beam as well as transmitting the first light beam and the second light beam to the first light valve and the second light valve respectively.

18. The projecting apparatus according to claim 10, wherein the first sensing light comprises at least one of visible light and infrared light.

* * * * *